Aug. 11, 1970 C. F. CHONG 3,524,174

SEARCH MEMORY

Filed Sept. 29, 1967

INVENTOR
CARLOS F. CHONG

BY Rene A. Kuypers
ATTORNEY

United States Patent Office 3,524,174
Patented Aug. 11, 1970

3,524,174

SEARCH MEMORY

Carlos F. Chong, Woodstock, N.Y., assignor to Sperry Rand Corporation, New York, N.Y., a corporation of Delaware Filed Sept. 29, 1967, Ser. No. 671,645
Int. Cl. G11c *7/00, 11/14, 15/00*
U.S. Cl. 340—174 8 Claims

ABSTRACT OF THE DISCLOSURE

This invention relates to a search memory technique using thin film magnetic storage elements wherein only one crossover per storage bit is required to store the data and only one crossover is required for the flag bit. This is accomplished by energizing the flag bit at a period of time which encompasses the leading pulse edges of the word line current and a reference line current when a "1" search is made. By way of example, if a "1" is searched for and a "1" bit is found, no current is generated to alter the condition of the flag bit (i.e., where the results of the search is stored) which is pre-set to the "1" state. However, when a "0" is found, a current is generated which changes the information in the flag bit from a "1" to a "0," thereby indicating a mismatch. The resulting mismatch current is in the direction to change the flag bit due to the encompassing of the leading edges of the data and reference line energizing currents with the energizing current applied to the flag line. When a "0" search is made, the flag bit is energized at a period of time which encompasses the trailing edge of the data line and reference line current pulses. When a search is made for a "0" and a "0" is found no current is generated to alter the condition of the flag bit which is in a "1" state. On the other hand, when searching for a "0" and a "1" is found, current is again generated in a direction so that the "1" in the flag position is altered to a "0," thereby indicating a mismatch condition. The mismatch current *is again in the proper* direction to change the flag bit due to the encompassing of the trailing edges of the energizing currents applied to the data and reference lines by the energizing current applied to the flag line.

This invention is related to the patent application Ser. No. 503,363, filed Oct. 23, 1965 by Woo F. Chow.

This invention relates in general to the field of digital memory devices. In particular, this invention relates to a search memory.

In known prior art search memories of the type herein described, it has been necessary for the data bits and the flag bits to include complementary data bits. In other words if a data bit was to store a "1," an additional complementary bit or "0" was required. In like manner, the flag bit or the location where the results of the search are stored also required a complementary location. The use of the complementary storage locations for the data bit and the flag bit unduly complicate the operation of the prior art search memory by requiring not only extra space which prevented the compact packing of such a device, but also in requiring additional circuitry and timing.

In summary, therefore, this invention relates to a technique for avoiding the necessity of known prior art devices for including complementary lines for the data and for the flag bits. Accordingly, the data and flag locations require only one crossover per bit.

Figure 1:
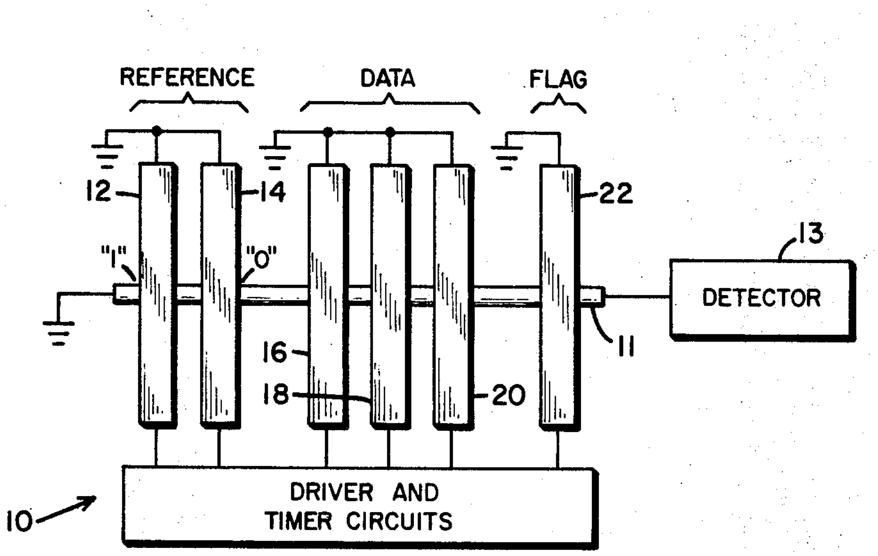

Referring now to the drawing, there is depicted in FIG. 1 a schematic arrangement of the invention wherein data, flag and reference lines orthogonally positioned to a memory word element.

Figure 2:
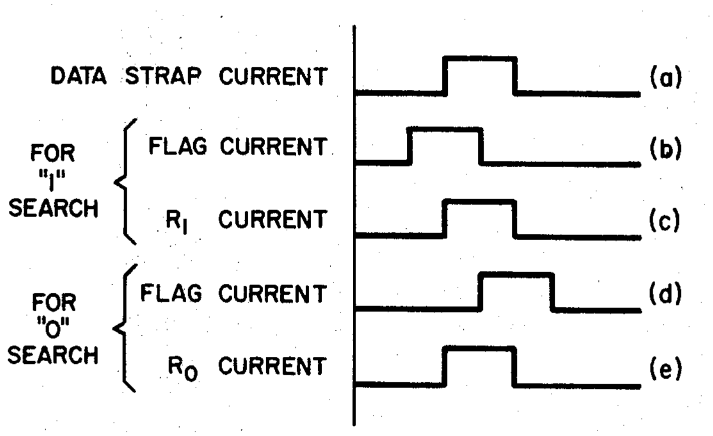

FIG. 2 depicts in accordance with this invention the timing of the signals applied to the data strap, the flag strap and the reference strap.

Referring now in particular to FIG. 1, there is shown a plurality of vertically arranged conductive straps 12, 14, 16, 18, 20 and 22. Straps 12 and 14 comprise reference straps, straps 16, 18 and 20 comprise data straps and strap 22 comprises a flag strap. One end of the straps are connected to the driver-timer circuit 10. It should be understood that each strap is connected to a separate driver and is logically timed and the driver-timer circuit is shown for convenience. The other end of the straps are connected to a terminal means such as ground in order to provide a complete circuit with the respective drivers and timing circuit which may also be grounded. Positioned orthogonally to the word straps is a single (for ease of understanding) plated wire memory element 11. The plated wire memory element 11 comprises a 5 mil diameter substrate upon which is coated a ferromagnetic substance. The ferromagnetic coating is placed on the substrate in such a manner that it has the property of a circumferential uniaxial anisotropy. In other words, the "easy" axis of the plated wire memory element 11 is circumferential and its "hard" axis is longitudinal. One end of the plated wire 11 is connected to the detector device 13 and the other end of the wire is terminated at ground so that a complete circuit is provided between the detector which is also grounded.

A binary "1" or a "0" is stored at a particular location on the plated wire 11 by orienting the magnetization vectors along the "easy" axis either in a clockwise or counterclockwise direction. For the sake of discussion hereinafter a binary "1" will be considered to have a clockwise orientation around the "easy" axis and a "0" will have a counterclockwise direction as viewed from the end of wire 11 and sighting to the left.

Referring now to the reference bits, the information stored at the intersection of the strap 12 and the plated wire 11 is a binary "1" whereas the information stored at the intersection of strap 14 of plated wire 11 is a "0." The information stored at the reference bits is permanent and do not change during the memory search operation.

The flag bits are stored along the intersection of strap 22 and plated wire 11, it should be noted that the information stored thereat is normally reset to a "1" and does not change as long as the information searched and the information stored is the same. The "1" stored at the flag location changes to a "0" as will be described more fully hereinafter when the information searched and the information stored is different.

Referring now to the data bits located at the intersection of the strap 16, 18 and 20 with plate wire memory element 11 it should be evident that this information changes as desired. In a practical application, the information, stored by the data bits may have reference to an individual's social security number, payroll tax, etc.

The operation of the search mode will now be discussed in order to demonstrate the instant invention. During the discussion of the search mode reference will be made to the accompanying FIG. 2. The search function is always begun by resetting the flag bit to a "1."

This is necessary since a flag bit may have been a "0" from a previous search cycle. The flag bit is reset to a "1" by conventional plated wire write techniques. Briefly, this involves energizing the strap 22 so that the magnetization vectors are rotated from the "easy" axis to a location less than 90° therefrom. While the magnetization vectors are in this position a bit steering current is supplied along the plated wire 11 by a bit steering means (not shown but may be just another bit on the plated wire). This causes the magnetization vectors to be switched from a "0" to a "1" or to a clockwise direction.

Let us assume that it is now required to search for a "1" data bit, and in particular the data bit located along the strap 16. For a "1" search, the flag strap 22 is first energized by the driver and timing circuit 10 so as to produce the pulse shown in FIG. 2(*b*). After the flag strap has been energized, the strap 16 (see FIG. 2(*a*)) and 14 (see FIG. 2(*c*)) are simultaneously energized by the circuit 10. Therefore it can be readily seen that since the data bit along strap 16 is a "1" and the data bit along strap 14 is a "0," the two signals induced in plated wire 11 by the rotation from the "easy" to the "hard" axis will be of opposite polarities and will cancel one another. Accordingly, since no signal is induced in plated wire 11 and since no current is generated therein, the flag bit will remain as a "1." This indicates that a matched condition has been found. In other words, a "1" has been searched for and a "1" has been found and therefore the flag indicates this fact by remaining as a "1."

Let us assume now that a "0" is stored at a bit position along strap 16 and a search is to be made for a "1." Thus, the flag strap 22 is again energized by the circuit 10 in the manner shown in FIG. 2(*b*). The conductive straps 14 and 16 are again energized thereafter by the circuit 10 in a manner shown in FIGS. 2(*a*) and 2(*c*). Since a "1" has a clockwise orientation and a "0" has a counter-clockwise orientation and since both bits are "0" in accordance with our example, a bit-steering current will be produced in plated wire 11 which flows from the left to the right direction. This results from the fact that there is a reduction of flux in the counter-clockwise direction and a current is induced to oppose this reduction in accordance with Lenz's Law. The bit steering current which produces this flows from left to right. For the purposes of discussion this current will be called a "negative current." Therefore, since the magnetization vectors of the flag that have been rotated to some angle less than 90° by the signal shown in FIG. 2(*b*), the negative bit steering current generated by the mismatch condition will generate an orthogonal magnetizing force which will flip the magnetization vectors of the flag bit through the 90° position so that they assume a counter-clockwise orientation. In other words, the flag bit has been switched from a "1" to a "0." This indicates a mismatch since a "1" was being searched for and a "0" was located in the memory. It should be noted in the above-discussed "1" search that the flag pulse shown in FIG. 2(*b*) encompasses the leading edge of the data strap current (FIG. 2(*a*)) applied to conductor 16 and the reference strap current (FIG. 2(*c*)) applied to strap 14.

Assume it is now required to accomplish a "0" search. The flag bit is first reset to a "1" in a manner previously described. For a "0" search, strap 16 and strap 12 are simultaneously energized in the manner shown in FIGS. 2(*a*) and 2(*e*). Since the bit located along strap 12 is a permanent "1" and if the bit located along strap 16 is a "0," the two induced voltages in plated wire 11 will therefore cancel, and no bit steering current will therefore be generated. It should be noted that for a "0" search the flag (see FIG. 2(*d*)) is energized after the pulses (see FIGS. 2(*a*) and 2(*e*)) are applied to straps 12 and 16. Therefore, the flag pulse (FIG. 2(*d*)) encompasses the trailing edge of the data and reference signals (FIGS. 2(*a*) and 2(*d*)).

Let us now assume that the bit along strap 16 is a "1" and a search will be made for a "0." Straps 12 and 16 are again simultaneously energized by the signal shown respectively in FIGS. 2(*a*) and 2(*e*). Since the bit along strap 16 is a "1" and the bit along strap is a "1" a signal will be induced in plated wire 11 of the same polarity. However, as mentioned above, the flag pulse shown in FIG. 2(*d*) is energized just prior to the time that straps 12 and 16 are being de-energized. Therefore, the bit steering current induced in plated wire 11 flows from a left to rightward direction (i.e., negative current) and causes the flag bit which is rotated to an angle less than slightly 90° to be flipped over and to become a "0" indicating that a mismatch has occurred. Since both the data bit along strap 16 and the reference bit along strap 12 were both "1's" and have a clockwise orientation, it is readily apparent in view of Lenz's Law that during the trailing edge of the signals applied to straps 12 (FIG. 2(*e*)) and 16 (FIG. 2(*a*)) the magnetization vectors will be returning to a quiescent position along the "easy" axis. Since there will be an increase in flux in the clockwise direction by this return to the "easy" axis a current will be induced in plated wire 11 which will oppose this increase in flux and therefore current will be induced which causes an increase in flux in the counter-clockwise direction. This current is a negative current and flows from left to right. In other words, this negative current causes an increase in flux in the counter-clockwise direction. Hence, the magnetization vectors of the flag bit will be switched from a "1" to a "0" bit by this negative bit steering current.

Although a search operation has been described for just one data bit along strap 16, it should be understood that similar cycles of operation would apply to the bits along strap 18 and 20 and to other data bits (not shown) as well. It can be further appreciated from the above description that a simple search cycle can take place without having complementary bits for the data and without complementary bits for the flag. This can be accomplished with just one crossover for each data bit and one crossover for each flag bit, wherein a crossover is defined in this invention as a crossing over a strap with a plated wire. This simplicity of construction and operation is obtained by utilizing a flag bit which encompasses the leading edge of the data and reference signals for a "1" search and a flag bit which encompasses the trailing edge of the data and reference signals for a "0" search.

Furthermore, the above description has been described with reference to a search function. However, other functions such as write-on match and address decoding as described in the above-mentioned prior art application can likewise be performed in accordance with this invention.

The embodiment of the invention in which an exclusive property or privilege is claimed are defined as follows:

1. The combination comprising:

a plurality of memory cells adapted to store information;

a sense means linking all of said memory cells;

first and second drive lines juxtaposed to respective first and second ones of said plurality of memory cells;

said first memory cell being permanently magnetized as a binary one bit and said second memory cell being permanently magnetized as a binary zero bit to provide reference bit information;

a third drive line juxtaposed to a third said memory cell, said third memory cell storing as a flag bit the results of a data search;

at least one further drive line, said drive line being juxtaposed to a remaining one of said plurality of memory cells, said last mentioned memory cell storing data information;

means for energizing respectively said drive lines juxtaposed to said data bit, the flag bit and one of said reference bits, wherein said drive lines juxtaposed to said data bit and said reference bit are energized within the same time period;

means for energizing the drive line juxtaposed to said flag bit during a portion of the time period that the energizing of said drive lines associated with said data and reference bits occurs;

means for energizing said drive line associated with said permanently magnetized binary one when searching for a binary zero and alternatively means for energizing said drive line associated with said permanently magnetized binary zero when searching for a binary one;

a siganl being detected in said sense means which is detected by said flag bit for determining whether the binary information searched for the binary information found is a match or a mis-match.

2. The combination in accordance with claim 1 wherein in search for a binary one data bit, the means for energizing the drive line juxtaposed to the flag bit generates a signal which encompasses the leading edge of the energizing signals applied during the same time period to the drive lines juxtaposed to the data bit and the reference bit.

3. The combination in accordance with claim 1 wherein in searching for a binary zero data bit, the means for energizing the drive line juxtaposed to the flag bit generates a signal which encompasses the lagging edge of the energizing signals applied during the same time period to the drive lines juxtaposed to the data bit and the reference bit.

4. The combination in accordance with claim 1 wherein said plurality of memory cells with a sense means linking all of said memory cells comprises a plated wire memory element.

5. The combination in accordance with claim 4 wherein said plated wire memory element comprises a copper beryllium substrate upon which is coated a permalloy film having the property of uniaxial anisotropy.

6. The combination in accordance with claim 5 wherein said copper beryllium substrate has a diameter on the order of 5 mils.

7. The combination in accordance with claim 5 wherein said permalloy film is composed of approximately 80% nickel and 20% iron.

8. The combination in accordance with claim 7 wherein said permalloy film is approximately 10,000 angstroms thick.

References Cited

UNITED STATES PATENTS

| | | | |
|---|---|---|---|
| 3,222,645 | 12/1965 | Davis | 340—174 XR |
| 3,257,650 | 6/1966 | Koerner | 340—174 |
| 3,438,009 | 4/1969 | Nissim | 340—174 |

BERNARD KONICK, Primary Examiner

G. M. HOFFMAN, Assistant Examiner